United States Patent [19]
Comer

[11] 3,955,653
[45] May 11, 1976

[54] ROTARY MOWER BLADE ARRESTER APPARATUS

[75] Inventor: Robert C. Comer, Hopkins, Minn.

[73] Assignee: The Toro Company, Minneapolis, Minn.

[22] Filed: Apr. 25, 1974

[21] Appl. No.: 463,960

[52] U.S. Cl. .............................. 188/273; 56/10.5; 123/110
[51] Int. Cl.² .................... A01D 75/20; F02D 9/06; F02D 9/02
[58] Field of Search .................. 56/10.5; 188/273; 123/107–110

[56] References Cited
UNITED STATES PATENTS

| 1,501,363 | 7/1924 | Noble | 188/273 |
|---|---|---|---|
| 1,519,213 | 12/1924 | Moore | 188/273 X |
| 1,577,466 | 3/1926 | Hyre | 188/273 |
| 2,074,651 | 3/1937 | Hoffman et al. | 188/273 |
| 2,736,153 | 2/1956 | Dunn | 56/10.5 |
| 3,229,452 | 1/1966 | Hasenbank | 56/10.5 |
| 3,557,762 | 1/1971 | Mitchell | 123/108 X |
| 3,788,288 | 1/1974 | Harrison et al. | 123/110 X |

FOREIGN PATENTS OR APPLICATIONS

| 1,079,449 | 5/1954 | France | 188/273 |
|---|---|---|---|
| 592,560 | 9/1947 | United Kingdom | 56/10.5 |

*Primary Examiner*—Paul E. Shapiro
*Attorney, Agent, or Firm*—Merchant, Gould, Smith, Edell Welter & Schmidt

[57] ABSTRACT

Apparatus for rapidly braking the rotary blade of a rotary mower driven by an internal combustion engine. The internal combustion engine has a plurality of passages which lead to its combustion chamber for provision of a fuel-air mixture for combustion in the chamber and for exit of exhaust gases from the chamber. The apparatus includes a valve located in one of these passages which effectively blocks the passage when manually operated means for actuating the valve are operated. In one embodiment, a release of a dead man handle used in conjunction with the mower causes actuation of the valve by means of a bowden wire linkage connected between the dead man handle and the braking valve. The apparatus may also include a switch operated simultaneously with the braking valve to provide an ignition spark arresting function.

5 Claims, 10 Drawing Figures

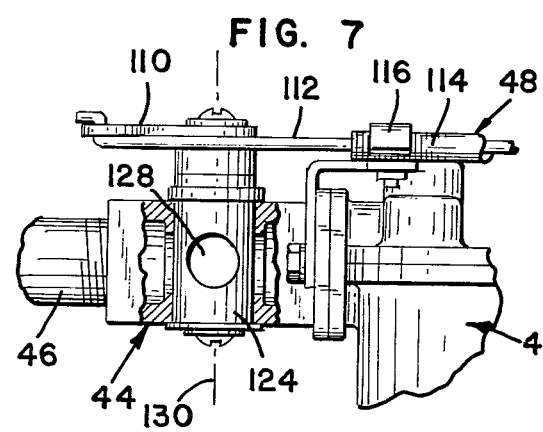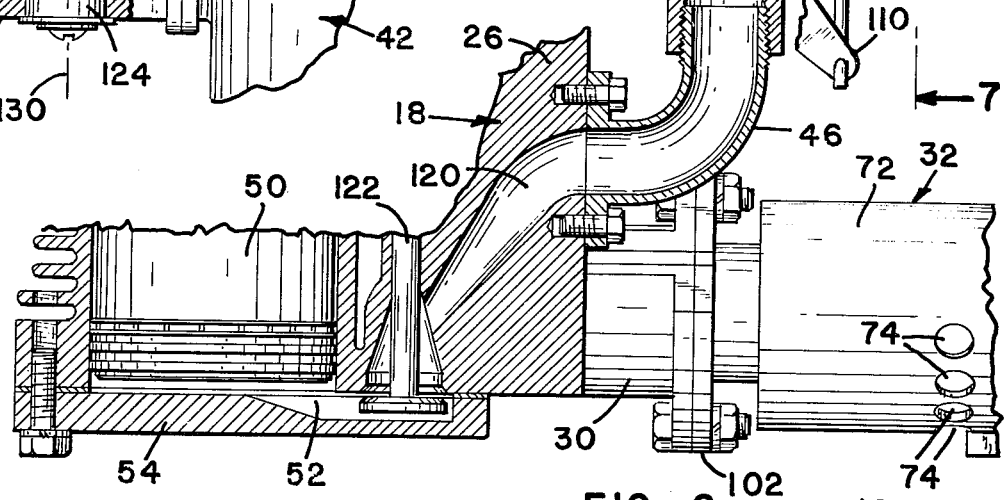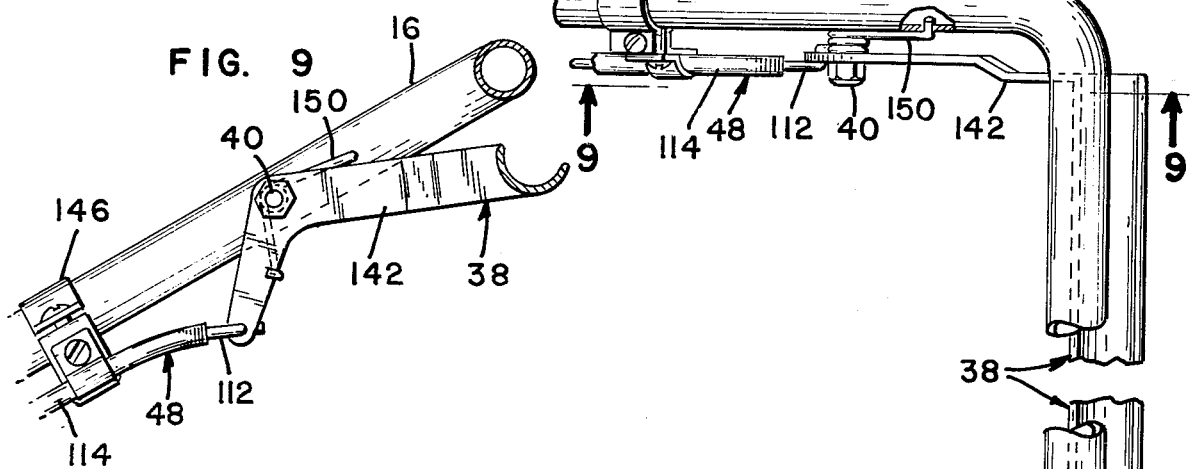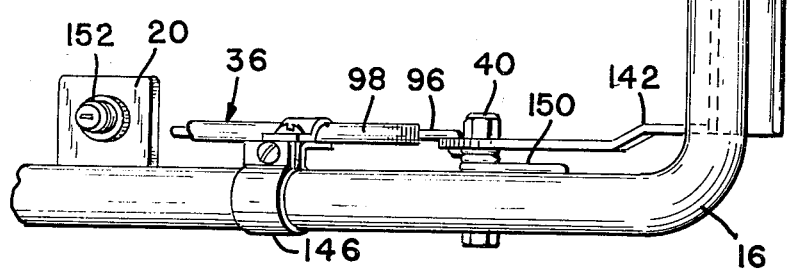

ROTARY MOWER BLADE ARRESTER APPARATUS

BACKGROUND OF THE INVENTION

This invention relates generally to power mowing apparatus and more particularly concerns improved apparatus for rapidly braking a rotary lawn mower blade or the internal combustion engine which drives it.

Presently used methods of braking the blade of a rotary mower normally involve either an ignition shorting switch adapted to ground the magneto output or spark plug center electrode to the engine block or closure of a valve which provides fuel to the carburetor of the internal combustion engine driving the mower. Each of these methods works on the principle that either cutting fuel to the system or cutting the spark available to ignite the fuel-air mixture in the system will rob the internal combustion engine of continued power. The result will be that the frictions of the system, together with drag on the rotary blade, will eventually act to brake the blade and cause blade rotation to cease. The normal maximum rotation rate of the blade of a rotary mower is of the order of 2400–3500 RPM. Because of this rapid rate and the inertia in the system, the time required to brake the blade using these methods may be longer than desired. It may, for example, be longer than the time required for a person to reach the mower after the mower operator recognizes that the person is approaching.

In addition to the desirability of having a braking time less than this "approach time," it is advantageous if it is possible to significantly brake the rotary mower blade in the amount of time normally required for the operator to leave the operating position at the end of the control handle and reach the vicinity of the rotating blade. If braking times within these constraints can be achieved, a dead man handle may be used to actuate the braking apparatus. When such an arrangement is used, the dead man handle will automatically actuate the braking apparatus when an opeator releases the control handle, for example, for the purpose of approaching the mower to remove the grass catching bag, to unclog the mower or for some other purpose. This is a desirable safety feature since the blade may be stopped by the apparatus before an unthinking operator can leave his position at the handle and injure himself by contact with the blade.

The present invention overcomes the disadvantage of long braking times associated with prior art apparatus in which the friction in the engine and linkage is used to brake the rotary mower blade. In addition, the present invention provides apparatus which stops the rotary mower blade in an amount of time of the order of the normal time between release of control handle pressure and contact between an operator and the machine housing.

SUMMARY OF THE INVENTION

In accordance with the invention, mower blade arrester apparatus for a grass mowing machine with a blade powered by an internal combustion engine is provided. The conventional internal combustion engine includes a piston mounted for reciprocating movement in a chamber defined by a cylinder and cylinder head. Valved passages communicate with the chamber to allow intake of a fuel-air mixture and exhaust of combustion products such as exhaust gases. The valved passages have valves the positions of which are synchronized with piston movement so that the passages may be used for intake and exhaust functions. A second valve is provided in one of the passages. This valve is operable in its first open position to allow control of fluid movement through the passage by the synchronized valve and piston. In its second, closed position, the second valve substantially constricts the passage to reduce or eliminate fluid flow through it. This second valve is associated with manually operated means which actuate it to cause it to assume the second position when blade arresting is desired.

If the second valve is in the exhaust passage, closure of the valve will result in a compressor-like effect during piston upstroke since there will be no open exhaust passage for escape of these fluids. The result will be expenditure of energy in compression of the fluids in the combustion chamber during the exhaust stroke and a braking effect will occur.

Alternatively, if the second valve is in an intake passage in which the fuel-air mixture is normally drawn into the combustion chamber during a piston downstroke, closure of the valve in the second position will require the piston to pull a partial vacuum during its downstroke. This will expend additional energy, causing the internal combustion engine to brake at a much faster rate than would occur without such a valve.

In some embodiments of the invention, the manually operated means simultaneously operates a spark arresting device which either shorts the center terminal of the spark plug to the engine block or grounds the magneto output, eliminating engine firing during the engine deceleration period. This should eliminate development of additional energy in the system as a result of the unwanted firing in the combustion chamber.

BRIEF DESCRIPTION OF THE DRAWINGS

Referring particularly to the drawings, wherein the use of like reference numerals throughout the several views indicates like elements:

FIG. 6 is a fragmentary partially sectioned view of elements of the structure of an alternate embodiment of the present invention;

FIG. 7 is a side view of a portion of the structure shown in FIG. 6 taken along the line 7—7 of FIG. 6:

FIG. 8 is a fragmentary plan view of the operator end of a mower control handle showing manually operated means for actuating the blade arrester valve;

FIG. 9 is a partially sectioned view of a portion of the handle shown in FIG. 8 taken along a line 9—9 of FIG. 8.

While the invention will be described in connection with preferred embodiments, the invention is not limited in scope to those embodiments. On the contrary, all alternatives, modifications and equivalents included within the spirit and scope of the invention as defined by the claims are covered.

DETAILED DESCRIPTION OF THE INVENTION

Figure 1:
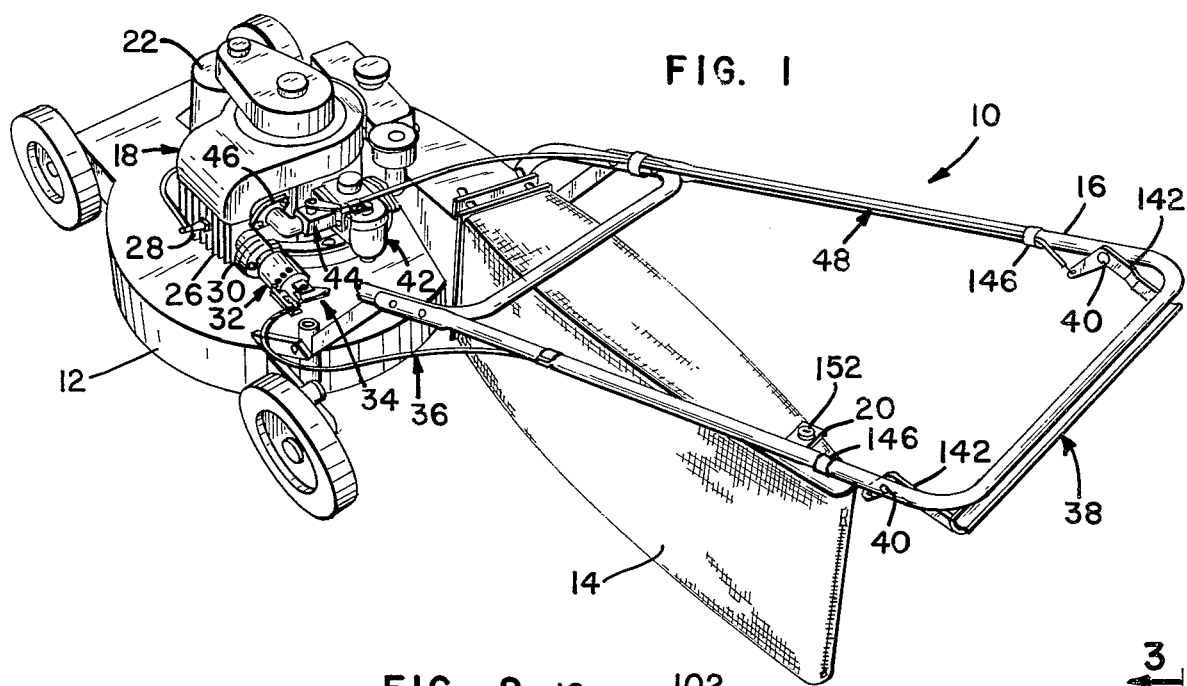
FIG. 1 is a view in perspective of a rotary lawn mower incorporating elements of two alternate embodiments of applicant's invention, a portion of the control handle being cut away.

Turning first to FIG. 1, a view in perspective of a rotary mower 10 incorporating the elements of two different embodiments of the present invention is shown. Rotary mower 10 has a blade housing 12, a grass catching bag 14, an operator control handle 16 and an engine generally designated 18. The engine shown in FIG. 1 is an electric start engine having a key start panel 20 mounted on a left leg portion of control handle 16. Key start panel 20 provides means for actuating a starter motor 22 which in turn provides starting drive for engine 18. Although engine 18 is a four cycle, internal combustion type and the operation of the embodiments of the present invention will be described in terms of use with four cycle engines, I believe that either of the embodiments of my invention shown and described would be effective when applied to mowers with two cycle internal combustion engines.

It should be clearly understood that while mower 10 is shown in FIG. 1 with elements of two separate embodiments of the present invention, the embodiments would not necessarily be used in combination for blade arresting on one mower. They are shown together on the mower of FIG. 1 merely for economy of description and to facilitate comparison of their placement and effect upon the operation of the mower.

Further, while the embodiments shown and described are applied to electric start mowers, it will be apparent that the present invention could as well be applied to a manual starting mower as long as some suitable means for actuating the braking valve is provided. In fact, a dead man handle type of actuator on the operator control handle could be used to actuate the braking valve on a manual start mower so long as the manual start mechanism was located sufficiently close to the handle.

Engine 18 of mower 10 is built about an engine block 26. Extending through engine block 26 into a combustion chamber (not shown in FIG. 1) is a spark plug 28. Extending outwardly from engine block 26 is an exhaust adapter section 30 connected to an integrated muffler-valve 32. Muffler-valve 32 incorporates a lift or poppet valve having a stem which extends longitudinally of adapter 30 and muffler-valve 32 to a valve actuator generally to muffler-valve 32. As used in this specification, "poppet" valve shall mean a valve whose direction of movement is perpendicular to the plane of its seat. Valve actuator 34 is connected to a bowden wire actuator linkage 36. The opposite end of the actuator linkage 36 is driven by a spring-biased dead man handle 38 which pivots about an axis defined by a pair of bolts 40. Muffler-valve 32 provides a braking valve for use in the exhaust passage of internal combustion engine 18. Bowden wire actuator linkage 36, valve actuator 34 and muffler-valve 32 are assembled so that, when an operator clutches dead man handle 38 and the operator end of control handle 16, handle 38 will pivot about bolts 40 to contact handle 16. The movement of handle 38 will be transferred through linkage 36 to actuator 34, which linkage will be adjusted to bring muffler-valve 32 into a first open position when dead man handle 38 is pivoted by operator pressure, and to allow muffler-valve 32 to return to a second, closed position upon release of operator pressure. Muffler-valve 32, actuator 34, linkage 36 and handle 38 are elements of one partiacular embodiment of the present invention in which a braking valve is placed in the exhaust passage of engine 18.

Elements of an alternate embodiment in which the braking valve is placed in an intake passage shall now be described. Fig. 1 also included a carburetor arrangement 42 for producing a fuel-air mixture for engine 18. The fuel-air mixture produced by carburetor 42 travels through a rotary valve 44, a portion of an intake tube 46 and into the combustion chamber of engine 18 during the intake stroke of a piston (not shown in FIG. 1) positioned for reciprocating movement internally of engine 18. Connected to rotary valve 44 is one end of a bowden wire actuator linkage 48, the opposite end of which is connected to a pivot arm on dead man handle 38. Actuator linkage 48 and valve 44 are adjusted so that, when dead man handle 38 is actuated by an operator to bring it into contact with handle 16, valve 44 will assume a first, open position. When operator pressure is released from handle 16 and dead man handle 38, a torsion or other spring will force dead man handle 38 away from handle 16 and transfer this movement by means of actuator linkage 48 to rotary valve 44 to bring it to a second closed position which blocks or substantially reduces flow through the intake passage to the combustion chamber.

Figure 2:
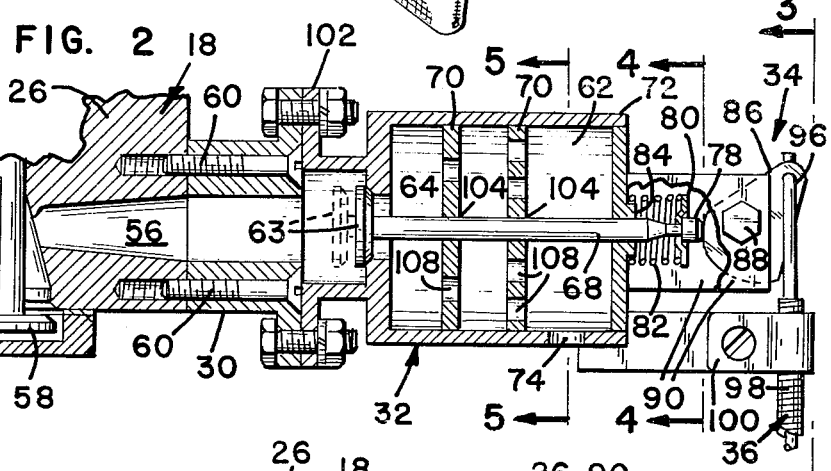
FIG. 2 is a fragmentary sectional view showing the structure of one embodiment of applicant's invention in which a braking valve associated with an exhaust passage is used.

FIG. 2 is a partially sectioned view of elements in an embodiment of the present invention in which the braking valve is placed in the exhaust passage. Engine block 26 is shown in cross-section, revealing a piston 50 and a combustion chamber 52 defined by engine block 26 and a cyliner head 54, a portion of which is also shown in section in FIG. 2. Spark plug 28 shown in FIG. 1 does not appear in the sectional view of FIG. 2 since it is above the sectional cut of cylinder head 54 taken to show elements of this embodiment of the invention. Leading from combustion chamber 52 is an exhaust passage 56. The flow through exhaust passage 56 is controlled by an exhaust valve 58 synchronized with reciprocating movements of piston 50 to open during exhaust upstrokes to allow exhaust gases and combustion products to exit chamber 52. FIG. 2 also shows adapter 30 in cross section. Adapter 30 is connected to block 26 by means of machine screws 60. Adapter 30 lengthens passage 56 and provides an intermediate adapter element to allow block 26 to receive muffler-valve 32. At one end of adapter 30 is a circular flange. Mating with this circular flange is a flange on muffler-valve 32. Fastening between the flanges is provided by means of nut-equipped bolts. Controlling the flow between passage 56 and an internal chamber 62 of muffler-valve 32 is a poppet valve comprising a valve head 63 which mates against a seat 64.

Valve head 63 carries a valve stem 68 thereon. Valve stem 68 extends through central guide holes in a pair of baffle plates 70. Muffler-valve 32 has a cylindrical housing 72 in which baffle plates 70 are mounted perpendicular to the axis of valve stem 68. Housing 72 has a number of holes 74 spaced about its cylindrical surface to allow exhaust gases to exit the muffler-valve. At an end of housing 72 opposite valve seat 64 a circular plate 76 closes housing 72 to define muffler chamber 62. Plate 76 is sealed to housing 72 and has a guide hole located centrally thereof through which valve stem 68 extends. A portion of valve stem 68 extending through plate 76 is tapered to a smaller diameter, then abruptly shouldered to define a stem end 78. Stem end 78 engages a washer 80 along the shoulder defined by it and the tapered stem portion. Washer 80 is in engagement with a helical spring 82. Helical spring 82 is captivated between washer 80 and plate 76 and spring-biases muffler-valve 32 into a closed position. A guide boss 84 through which stem 68 also extends controls the position of the coil of spring 82 which contacts plate 76.

Stem end 78 engages the surface of a cam 86. Cam 86 pivots about a shaft 88 extending transversely of valve stem 68. Shaft 88 is carried by a clevis formed of two ears 90 and plate 76. Cam 86 is pivotally driven about the axis of shaft 88 by means of bowden wire actuator linkage 36 as shown in FIG. 1. Bowden wire linkage 36 has an actuating wire 96 housed in a coiled wire casing 98. Coiled wire casing 98 is held by a bracket 100 fixed in turn to housing 72. In FIG. 2, the poppet valve is illustrated in its closed position with valve head 63 in mating contact with valve seat 64. Helical spring 82 tends to hold valve 32 in this position. In response to operator pressure which pivots dead man handle 38, actuator wire 96 is drawn into outer housing 98, which causes pivotal movement of cam 86 and lifts valve head 63 from seat 64 to allow the exhaust passage to be controlled by valve 58.

Figures 3, 4, 5:
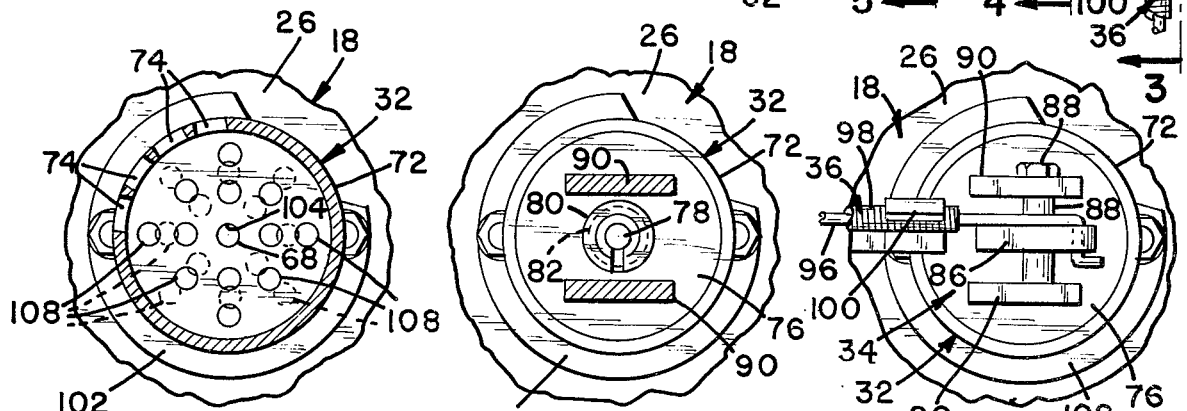
FIG. 3 is a side view of a portion of the structure shown in FIG. 2 taken along the line 3—3 of FIG. 2.
FIG. 4 is a sectional view of a portion of the valve structure shown in FIG. 2 taken along the line 4—4 of FIG. 2.
FIG. 5 is a sectional view of a portion of an integrated muffler-valve which is an element of the structure of FIG. 2, the section being taken along line 5—5 of FIG. 2.

FIG. 3 is an end view of the apparatus of FIG. 2 illustrating details of bowden wire linkage 36 and valve actuator 34. Shaft 88, as previously mentioned, is mounted between ears 90 to provide a pivot axis for cam 86. Cam 86 is pivoted by means of movement of actuator wire 96 attached thereto. A bracket 100 holds coiled wire casing 98 in a fixed position.

FIG. 4 is a fragmentary sectional view showing a portion of the apparatus with the actuating cam and bowden wire arrangement cut away. Ears 90 together with plate 76 form a clevis for mounting of the shaft for cam 86. Illustrated in FIG. 4 is the surface of stem end 78 which contacts cam 86, as well as washer 80 which engages the shoulder of stem end 78. Represented by a dotted line circle in FIG. 4 is helical spring 82 which spring-biases the poppet valve into a closed position. Also shown is housing 72 of muffler-valve 32 to which end plate 76 is sealed. Lastly, a flange 102 of housing 72 is fastened to adapter 30 by means of nut-equipped bolts shown in the Figure.

FIG. 5 is a sectional view of a portion of mufflervalve 32 illustrating structure of a typical baffle plate as well as structure of the housing. Exit holes 74 in the housing are shown in section in FIG. 5. A central guide hole 104 through which stem 68 of the valve may extend and be carried by plate 70 is provided. Spaced about guide hole 104 are a number of additional holes 108 which provide a flow path for exhaust gases. In one embodiment of the muffler-valve 32, two baffle plates 70 were used, each having the same hole pattern. The plates were then mounted in housing 72 with the hole patterns at 45° to one another. In this way the plates function as acoustical energy attenuators, at the same time guiding the stem of the poppet valve integral with the muffler.

It will be understood by those of skill in the art that it is not necessary to the present invention that the braking valve used in an exhaust passage as an arrester valve be integral with the system muffler. However, a muffler-valve as shown provides a dual function with a miniumum number of parts. For this reason, it is a preferred specific embodiment when the braking valve is used in the exhaust passage.

In operation of the embodiment using muffler-valve 32, the operator will perform a starting sequence including first clutching handles 16 and 38, then operating key start panel 20. Operator pressure on handle 38 will bring muffler-valve 32 to an open position. This will allow engine 18 to start in response to flywheel rotation imparted by starter motor 22, since an escape route for exhaust gases will be provided. Cam 86 will maintain valve 32 in its first, open position while pressure is exerted on the control handle. Should the operator leave the control handle to stop the machine, dead man handle 38 will return to its released position, actuating wire 96 will extend to pivot cam 86 so that the surface of stem end 78 rides on a low portion of cam 86. Spring 82 then forces stem 68 outward. In this position valve head 63 contacts valve seat 64 and muffler-valve 32 will assume a second, closed position. This will close exhaust passage 56, preventing exhaust gases from exiting the combustion chamber through exhaust passage 56. The result will be a compressor-like effect which will absorb substantial kinetic energy from the reciprocating piston 50 slowing the piston and consequently the rotary blade driven thereby at a much more rapid rate than merely using the friction in the system.

In addition, some embodiments of the present invention may utilize a switch actuated by the dead man handle which grounds the magneto or spark plug center electrode to prevent development of an ignition spark within the combustion chamber. This may aid the effect of the braking valve by preventing combustion of any fuel-air mixture within the chamber during the braking process. Such a spark arrest feature will be described further in connection with FIG. 10.

FIG. 6 illustrates an alternate embodiment of the blade arresting apparatus of the present invention. FIG. 6 is similar in form to FIG. 2, with partially sectioned views of the engine block illustrating the interaction between the blade arresting apparatus and internal combustion engine 18. Attached to a fragmentary portion of caraburetor 42 is rotary valve 44. Rotary valve 44 has a pivot arm 110 thereon which is connected to an actuator wire 112 of a bowden wire actuator linkage generally designated 48 in FIG. 1. Similar in construction to the linkage previously described in connection with the braking valve of FIG. 2, bowden wire linkage 48 has a casing 114 fixed to a portion of carburetor 42 by means of a clamp 116. Intake tube 46 connects one end of rotary valve 44 to engine block 26. Engine block 26 has an air-fuel intake passage 120 therein which extends through tube 46 and valve 44 to carburetor 42. Intake passage 120 is, during normal mower operation, controlled by a fuel-air intake valve 122 synchronized in movement with the reaciprocating movement of piston 50. Valve 122 normally opens during an intake downstroke of piston 50. This allows an air-fuel mixture to be drawn into combustion chamber 52 by the partial vacuum created by piston 50 during its downstroke.

FIG. 7 is a side view of the same apparatus, in particular showing portions of rotary valve 44 cut away to reveal inner structure. In that figure, a cylindrical valve head 124 having a cylindrical hole 128 drilled through the head perpendicular to the head axis is shown. Head 124 is mounted for rotation about an axis 130. When head 124 is rotated to an orientation where the ends of passage 128 communicate with tube 46 and carburetor 42, the valve is in its first, open position. This permits flow of the air-fuel mixture through the valve and intake passage to the combustion chamber. When head 124 is rotated about axis 130 a sufficient amount from the open first position, passage 128 no longer communicates with intake passage 120 to provide a path for the fuel-air mixture from the carburetor to the intake passage 120. The valve is then in a second, closed position which functionally corresponds to the closed position of the poppet valve in the embodiment using an exhaust valve as a blade arrester.

The operation of embodiments where the second valve placed in the system is used in the intake passage will now be briefly described. During normal operation of the mower, the mower will be started by compression of dead man handle 38 against handle 16 and use of key start panel 20 to electrically start engine 18. The bowden wire actuator linkage 48 whose actuator wire 112 controls the position of pivot arm 110 which in turn actuates rotary valve 44 will be so adjusted that when dead man handle 38 is brought into contact with handle 16, rotary valve 44 will assume its open position, allowing the fuel-air mixture from carburetor 42 to freely flow through passage 120 to combustion chamber 52. Relase of dead man handle 38 will result in a change of position of actuator wire 112 since its position is controlled from the opposite end of bowden wire linkage 48 by the position of a pivot arm on handle 38. The result will be to bring rotary valve 44 into a closed position which will prevent further supply of the fuel-air mixture to combustion chamber 52 for combustion and powering of internal combustion engine 18. More importantly, it will cause a partial vacuum against which piston 50 must pull when in its fuel intake stroke. This vacuum pump type effect will expend considerable energy and cause the internal combustion engine 18 to brake at a much more rapid rate than would occur if the supply of fuel were cut to the carburetor or the spark were merely arrested.

As previously mentioned, in some embodiments of the present invention, spark arresting may accompany closure of the valve which provides the blade arresting function by preventing combustion of the fuel-air mixture within the chamber during the braking process. This spark arrest feature may be used in combination with embodiments of the present invention in which the braking valve is placed in the intake passage as well as those in which the valve is in an exhaust passage.

Referring now to FIGS. 8 and 9, details of one handle construction using a dead man handle to actuate the blade arresting apparatus are illustrated. A U-shaped end potion of control handle 16 appears in FIG. 8. The legs of the U-shaped portion extend to fasten to housing 12 not shown in the Figure. A pair of bolts 40 extend through opposite legs of the handle and dead man handle 38 is pivotally mounted with respect to an axis defined by the centers of bolts 40. Dead man handle 38, as shown in FIGS. 8 and 9, has a pair of pivot arms 142. Each of these pivot arms has a hole positioned near one end for engagement of an actuator wire from a bowden wire actuator linkage. In embodiments of the present invention in which spark arresting is combined with use of the braking valve, a bowden wire linkage controlled by one pivot arm could be used to actuate the braking valve, the opposite pivot arm engaging a linkage which simultaneously operates a switch grounding the magneto or spark plug center electrode. On the other hand, those of skill in the art will recognize that dead man handle 38 could as well engage only one bowden wire linkage to operate the braking valve despite the fact that two linkages are shown in FIG. 8.

Shown attaching the outer casings of the bowden wire linkages to opposite legs of handle 16 are a pair of brackets 146. Mounted by means of bolts 40 are a pair of torsion springs 150 each of which spring biases dead man handle 38 away from the bottom surface of U-shaped handle 16. When a bowden wire linkage controlling a braking valve is attached to the pivot arm of dead man handle 38, the dead man handle construction provides a means for manually operating the braking valve. Whenever dead man handle 38 is released and allowed to assume a position spaced from handle 16, the braking valve controlled by the bowden wire linkage attached to the handle will close, thereby rapidly braking engine 18 and the blade driven by it.

Figure 10:
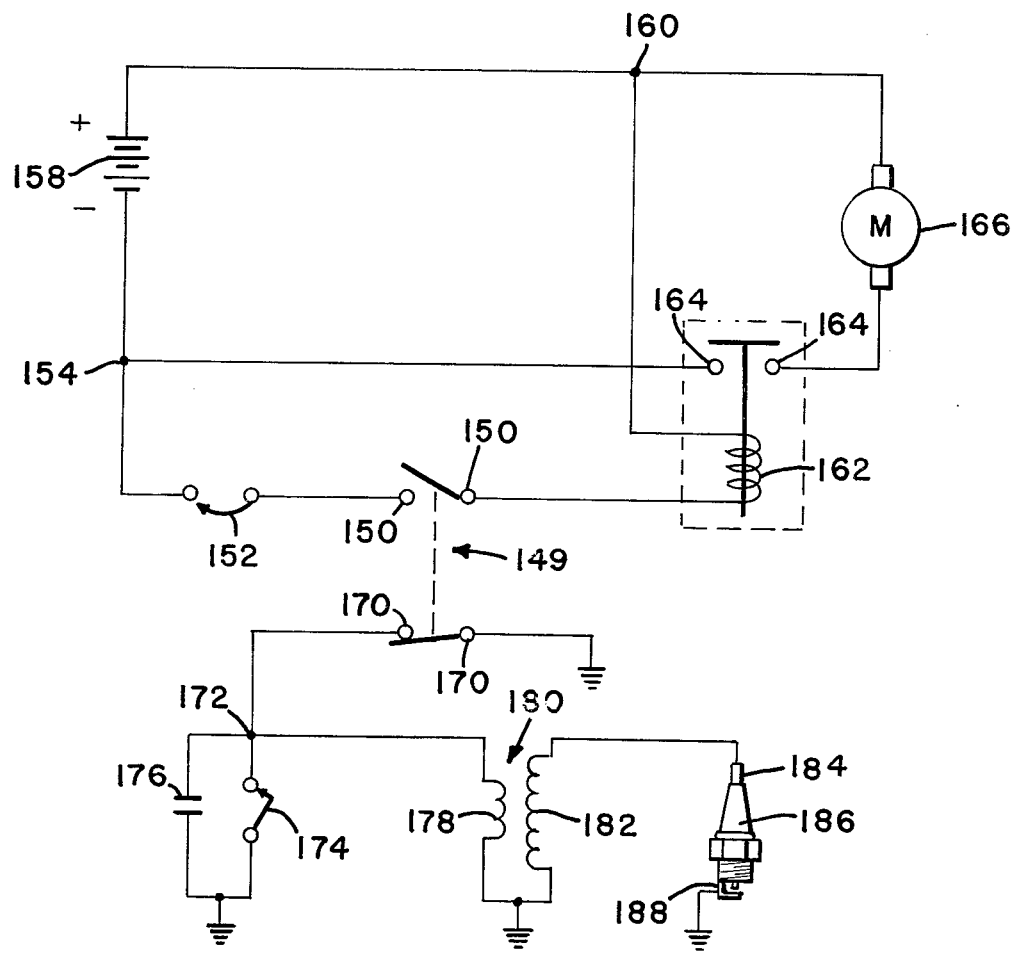
FIG. 10 is an electrical schematic diagram showing elements in the starting and ignition circuits of a mower in which the apparatus arrests ignition spark in addition to providing a braking valve.

FIG. 10 is a schematic diagram of an electrical circuit showing possible functions of the dead man handle in addition to actuating the braking valve. In certain embodiments of the present invention, the dead man handle or other manually operated means may, in addition to actuating the braking valve, actuate an electrical dead man switch 149 having two sets of contacts, one set being normally open and the other normally closed. Normally open contacts 150 of switch 149 function in the starting circuit and are electrically connected to a key switch 152 which is in turn connected to a junction point 154. Junction point 154 is connected to a battery 158. Battery 158 has a positive terminal connected through a junction point 160 to one end of a coil 162 of a starting solenoid. The other side of coil 162 is connected to normally open contacts 150. Connected in series between junction points 154 and 160 are contacts 164 of the starting solenoid and a starter motor 166.

To start the mower, an operator will clutch an operating handle, actuating dead man switch 149 to close contacts 150. While clutching the handle, the operator then turns key switch 152. This will complete a circuit through these two sets of contacts to provide power to starting solenoid coil 162. Pull-in of the starting solenoid will in turn provide battery power to starter motor 166 through solenoid contacts 164. Starter motor 166 will then rotate the flywheel of engine 18 for starting thereof.

FIG. 10 also shows elements of an ignition circuit for engine 18. A set of normally closed contacts 170 of dead man switch 149 are connected between ground and a juntion point 172. Also connected between junction point 172 and ground are a set of ignition breaker points 174, a charging capacitor 176 and one side of a primary coil 178 of a magneto generally designated 180. The opposite side of primary coil 178 and one side of a secondary coil 182 of magneto 180 are connected to a common ground. The opposite side of coil 182 is connected to a center electrode 184 of a spark plug 186. Plug 186 also has a side electrode 188, grounded by threading the plug into the engine block.

During normal operation of the ignition circuit and combustion engine, contacts 170 of dead man switch 149 will be open as a result of operator pressure on the dead man handle. In this configuration, magneto 180 generates current which will be stored as charge on capacitor 176 during times when points 174 are open.

The charge so stored will be converted to a higher voltage level at secondary coil 182. When the voltage on coil 182 reaches a high enough level, a spark will travel between electrodes 184 and 188 of plug 186. As is well known, the spark will be timed to ignite a fuel-air mixture in the engine combustion chamber to provide motive power for the engine.

However, upon release of the dead man handle, contacts 170 will assume their normally closed position and ground the normally ungrounded side of coil 178 to magneto 180. The result will be to eliminate build up of charge for use as an ignition spark and to prevent ignition of air-fuel mixture in the combustion chamber.

While the invention has been described in conjunction with specific embodiments, it is evident that many alternatives, modifications and variations will be apparent to those of skill in the art in light of the foregoing description. For example, the braking valve used in the present invention may be placed in any one of a number of passages co-operating with the combustion chamber. In addition, in some embodiments, more than one such valve may be used. Furthermore, the valve or valves may in certain embodiments be used with a switch or other mechanisms to arrest the ignition spark, and both may be actuated by a dead man handle and associated linkages or by other manually operated means. In view of these and other possibilities, it is intended to embrace all such alternatives, modifications and variations that fall within the spirit and broad scope of the appended claims.

I claim:

1. Apparatus for braking an implement powered by an internal combustion engine including a piston mounted for reciprocating movement in a cylinder and a valved exhaust passage communicating therewith, a valve therein opening and closing in synchronization with piston movement to allow flow of fluids through said exhaust passage to accomplish said exhaust function, comprising:
   a. a muffler unit connected to said exhaust passage and having a housing carrying a plurality of perforated baffle plates with axially aligned guide holes therein;
   b. a poppet valve having a valve head carried by an actuator stem extending through said guide holes, said poppet valve being operable in a first, open position to allow control of fluid movement through said exhaust passage by the synchronized valve associated with said exhaust passage, and operable in a second closed position to substantially reduce flow therethrough; and
   c. control means for causing said poppet valve to assume said second position when implement braking is desired.

2. The apparatus of claim 1 wherein one end of said housing defines a valve seat which mates with said valve head in said second position to substantially block said exhaust passage.

3. The apparatus of claim 2 wherein said stem extends through the opposite end of said housing, and the apparatus further includes spring means external to said housing biasing said valve into said second position.

4. The apparatus of claim 3 wherein said spring means comprises a coiled compression spring, the end of said stem opposite said head includes spring captivation means, and said spring is captivated between said captivation means and the end of said housing through which said stem extends.

5. The apparatus of claim 3, wherein said control means includes a cam actuator having a cam mounted for rotation about an axis transverse to said stem axis, and associated with said valve stem so that rotation of said cam results in axial movement of said valve stem to cause said valve to assume said second position.

* * * * *